March 7, 1939.  J. M. TRINER  2,149,478
PRINTING MECHANISM
Filed March 27, 1936  2 Sheets-Sheet 1
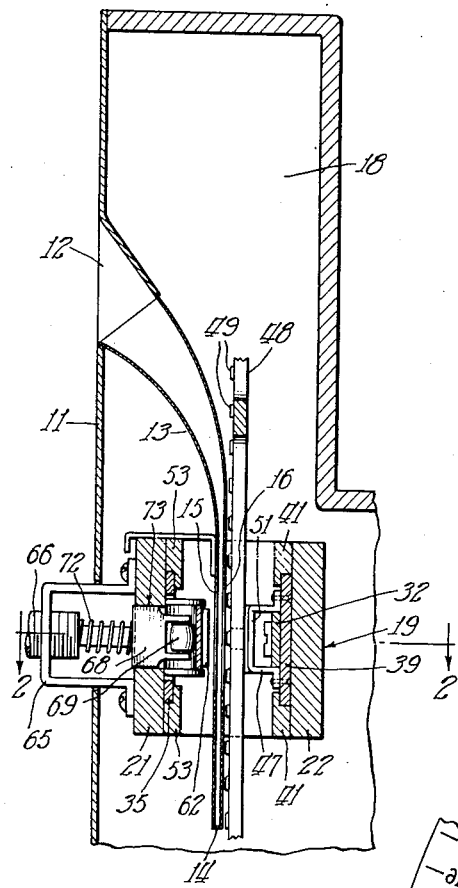
Inventor:
James M. Triner
By Walter M. Fuller
Atty.

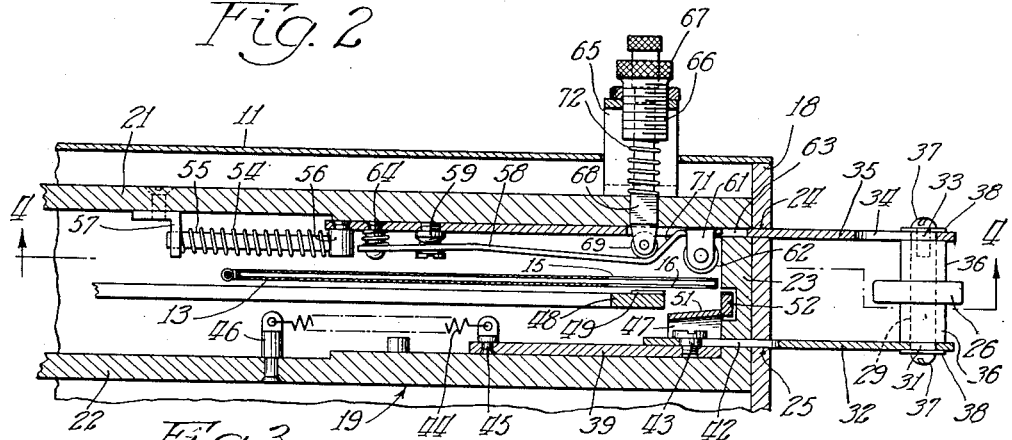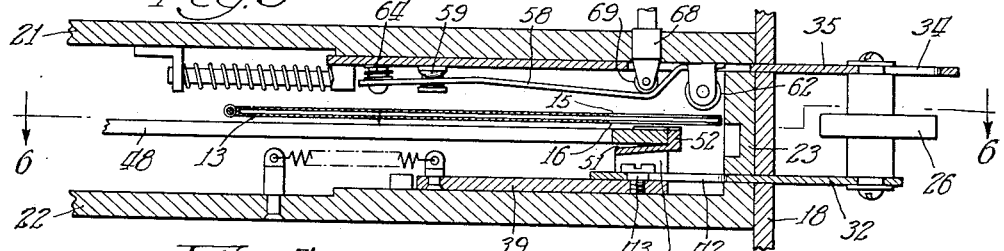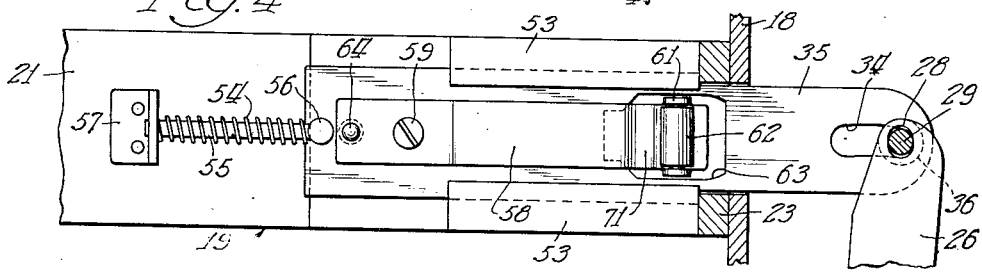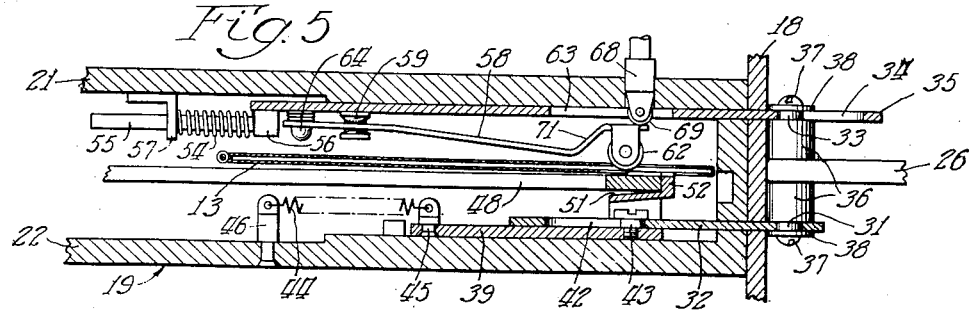
Inventor:
James M. Triner
By: Walter M. Fuller
Atty.

Patented Mar. 7, 1939

2,149,478

UNITED STATES PATENT OFFICE 2,149,478

PRINTING MECHANISM

James M. Triner, Chicago, Ill., assignor to Triner Scale & Manufacturing Company, Chicago, Ill., a corporation of Illinois Application March 27, 1936, Serial No. 71,154

5 Claims. (Cl. 101—93)

The present invention relates to means for printing and pertains more especially, but not necessarily restrictedly, to improved and novel means for printing the weight of a body or load resting on the platform of a weighing scale, as, for example, by means of raised or type figures on a rotary dial or disc graduated on its other side to visually display the amount of weight of such load or body.

A leading object or purpose of the invention is to provide a construction of this general character which may be operated with facility, which is simple in structure and therefore relatively inexpensive to manufacture, which is reliable in action, which performs its functions in a wholly satisfactory and gratifying manner, and which is susceptible of easy adjustment.

To the accomplishment of these and other desirable aims a present preferred embodiment of the invention has been devised and illustrated in the accompanying drawings forming a part of this specification and throughout the several views of which like reference numerals have been employed to designate the same parts.

In these drawings:—

Figure 1 is a vertical section through a portion of a weighing scale showing the new printing mechanism in association with the graduated wheel or disc operated by the load on the scale platform (not shown) to turn on its axis an amount proportional to the weight of the load;

Figure 2 is a horizontal section on line 2—2 of Figure 1 the parts being viewed looking downwardly;

Figure 3 is a similar horizontal section illustrating some of the elements of the appliance in different positions preliminary to the printing operation;

Figure 4 is a vertical, longitudinal section on the broken line 4—4 of Figure 2, the parts being viewed in the direction indicated by arrows;

Figure 5 illustrates the several mechanical elements in the positions which they occupy during the printing operation;

Figure 6 is a section on line 6—6 of Figure 3 and presents the type wheel gripping or anchoring mechanism in detail; and Figure 7 is an enlarged, sectional, detail view through the rubber printing-roller whose travel results in effecting the performance of the printing operation.

Referring to the views of the drawings, it will be noted that a wall 11, ordinarily the back wall, of the weighing scale casing is provided with an opening or slot 12 (Fig. 1) communicating with a thin card or paper holding and guiding housing 13 closed at its lower end at 14 against which the bottom edge of the card or paper may rest when being printed, the opposite, thin, sheet-metal walls of such guide or housing 13 being apertured in register at 15 and 16.

The card or paper 17 (Fig. 7), whichever is used, is covered with a carbon paper sheet (not shown) on one side, by means of which the printing is accomplished in much the same way that carbon copies are made in a typewriter.

On an adjacent wall 18 of the scale housing, or in any other approved manner, a hollow casting, designated as a whole 19, is mounted (Fig. 2) inside of such housing, this member 19 having parallel side-walls 21, 22 and a connecting end-wall 23 provided with parallel, vertical slots 24, 25.

An actuating lever-handle 26 is fulcrumed at 27 on the exterior of such wall 18, so that the handle is readily accessible for manipulation, the upper end of such lever being slotted at 28 (Fig. 6) for the accommodation of a cross-pin 29 (Figs. 2 and 6), one end 31 of which is fixed to a slide 32 reciprocatory through slot 25, the opposite end 33 of the pin extending through a longitudinal slot 34 in a companion slide 35 working through the other slot 24, the cross-pin conveniently having spacing-spools 36, 36 between the faces of the lever-handle 26 and the inner surfaces of the complementary slides 32 and 35, the pin also at its opposite ends having screws 37, 37 and associated washers 38, 38 to connect the parts together properly.

From what precedes, it will be clear that when the operator pulls the lower end of the handle 26 outwardly or away from the casing, its upper end moves inwardly and first shifts the slide 32 inwardly and later carries the other slide 35 in the same direction due to the loose connection 33, 34 with such second slide.

As will be explained hereinafter, the first of such movements occasions the locking or clamping of the printing-wheel against turning and other displacement and the second of the specified movements performs the printing operation.

Slide 32 is connected to a larger slide 39 controlled in its line of travel by guides 41, 41 (Fig. 6) by means of a lengthwise slot 42 in part 32 and a screw 43 (Fig. 2) mounted on slide 39 and occupying such slot, such larger slide 39 being pulled inwardly of the casing by a coiled, contractile spring 44 connected to a pin 45 on the slide and to a correlated pin or stud 46 on the stationary part 22.

This slide 39 carries a clamp or anchor 47 for the rotary weighing-wheel or graduated-ring 48 of the scale which has raised type figures or legends 49 on its rear face corresponding to the weights of the loads on the scale platform, the various correct type figures being brought to printing position, so that the printed card or paper will display a legend showing the amount of weight of any particular load undergoing the scale-weighing operation.

Although not shown in the drawings, the front face of such indicating wheel or disc 48 displays similar weight-legends which are visible individually to the operator so that he can see the correct weight by viewing the single legend displayed.

Part 47 comprises two sections, the one section 51 having a slightly-bevelled or wedge-shaped face to engage the surface of the wheel 48 opposite the type numerals 49, the other section comprising a flange 52 adapted to engage and bear against the edge of the wheel.

The inoperative position of all of these mechanical elements is indicated in Figure 2, their operative relationship being presented in Figures 3 and 5.

The companion slide 35 is directed in its reciprocatory movements by stationary guide-bars 53, 53 (Fig. 4) and the slide is pushed outwardly by a coiled spring 54 encircling a rod 55 and pressing at its opposite ends against a stud 56 on the slide and against an abutment 57 on the stationary part 21.

Slide 35 inside of the casing has a bent or cam bar 58 rockingly mounted or fulcrumed thereon at 59 for slight movement in a horizontal plane, one end of such bar having ears 61 carrying a revoluble, rubber-faced roller 62 located in alignment with the registering apertures 15 and 16 of the card or paper receiving housing 13.

This roller-equipped end of bar or lever 58 is normally held retracted in a slot 63 in slide 35 and against the adjacent face of part 21 by a coiled spring 64 acting on the opposite end of the fulcrumed bar, such spring being interposed between the bar and the slide.

A bracket 65 mounted on the element 21 and extended outwardly through an opening in the casing-wall 11 is fitted with a screw-threaded passage accommodating a hollow adjustment-screw 66 having a knurled head 67 by means of which it may be turned, the bore of the screw slidingly receiving the cylindrical stem of a bracket 68 carrying a revoluble pressure-roller 69 cooperating with a cam portion 71 of lever 58, a spring 72 interposed between the bracket 68 and the end of the screw 66 and surrounding the stem of such bracket tending to force the bracket and its roller inwardly toward the scale printing-wheel 48.

Bracket 68 extends through and is guided in its movements by the walls of an opening 73 in element 21, the innermost part of the bracket extending through slot 63 so that its roller 69 may coact with the inclined and adjacent parts of the lever 58.

The operation of this novel printing-mechanism occurs practically as follows:—

When the rotary weight-indicating wheel 48 has come to rest after the load to be weighed has been deposited on the scale-platform, the type numeral 49 corresponding to such weight will be in correct printing position in that part of the mechanism shown in the drawings.

The operator thereupon grasps the lower handle portion of lever 26 and pulls it outwardly, thus causing its upper end to travel inwardly whereby the compound or duplex slide 32—35 at once moves inwardly under the pulling action of its spring 44, and during such operation the wedge-clamp 51 engages the front face of the indicating-wheel 48 and braces and holds it against movement, but such inward travel of slide 32 and its clamp or anchor 47 is terminated when the flange or stop 52 strikes the edge of the wheel (Figs. 3 and 5).

Owing, however, to the loose slot-and-screw connection 42, 43 between these two slides, the part 32 may continue and complete its inward stroke as presented in Figure 5.

Due to the play between lever 26 and the other slide 35 by reason of the pin end 33 being movable in the slot 34, such slide does not begin its inward stroke until about the time the indicating-wheel has been locked in place as just described and during such travel against the counter-pressing action of spring 54 the printing-roller lever 58 necessarily goes with it, and the inclined or sloping part 71 of lever 58 moves in due to its engagement with the pressure-roller 69, the spring 72 of the latter thereupon imposing its pressure on the printing-roller 62 and its lever 58 causing such roller to engage the card or paper in the guiding and positioning casing 13, whereby the roller rolls over the portion of the card or paper exposed through the opening 15 and presses it against the closely adjacent type-legend 49 on the now locked indicating-wheel 48, thus effecting the printing of the proper weight legend on the card or paper through its carbon paper (not shown) overlying its face.

The printing operation having been thus consummated, the handle 26 is swung in the opposite direction to return the various cooperating elements of the mechanism to their original positions, this action being aided by the expansion of spring 54.

If the card or paper is left in place during both strokes of the printing-roller 62, the printing operation will occur twice through a double impression.

The card or paper having been thus printed, it is removed through the entrance or mouth 12 and it will have had printed on it the correct weight of the load imposed on the platform of the scale.

From the foregoing it will be apparent that the combined indicating and printing wheel or disc 48 is held firmly in position during the printing action both against rotation and against backing away from the impression roller.

Those acquainted with this art will readily understand that the invention as herein set forth is susceptible of a variety of embodiments and is not necessarily limited to the particular one shown and described and that various mechanical modifications may be resorted to without departure from the heart and essence of the invention as defined by the appended claims and without the loss or sacrifice of any of its substantial or material benefits and advantages.

I claim:

1. In a printing-mechanism, the combination of a rotary wheel carrying a series of type-legends on a side face thereof adapted by its movements to bring said legends individually into a printing position, slidable means having a bevelled surface to engage the side face of said wheel opposite that bearing said legends to hold and to support the wheel clamped against movement during the printing action, means to guide the element to be printed into position with relation to the type-legend of said wheel which is in printing position, means to press said element and said type-legend against one another to affect the printing operation, and means common to said holding-means and pressing-means to slide said holding-means to clamp said wheel against movement and then to actuate said pressing-means to effect the printing action.

2. In a printing-mechanism, the combination of a rotary wheel carrying a series of type-legends on a side face thereof adapted by its movements to bring said legends individually into a printing position, means having a bevelled surface to engage the face of said wheel opposite that bearing said legends and a surface to engage the edge of said wheel to hold the wheel clamped against movement during the printing action, means to guide the element to be printed into position with relation to the type-legend of said wheel which is in printing position, means to press said element and said type-legend against one another to effect the printing operation, and means common to said holding-means and said pressing-means to actuate said holding-means to clamp said wheel against movement and then to actuate said pressing-means to effect the printing action.

3. In a printing-mechanism, the combination of a rotary wheel carrying a series of type-legends on a side face thereof adapted by its movements to bring said legends individually into a printing position, means to engage the face of said wheel opposite that bearing said legends to hold the wheel clamped against movement during the printing action, means to guide the element to be printed into position with relation to the type-legend of said wheel which is in printing position, a roller, means to roll said roller on said element to press said element and said type-legend against one another to effect the printing operation, and means common to said holding-means and said rolling means to actuate said holding-means to clamp the wheel against movement and thereafter to actuate said rolling means to effect the printing action.

4. In a printing-mechanism, the combination of a rotary wheel carrying a series of type-legends on a side face thereof adapted by its movements to bring said legends individually into a printing position, means including a loose-motion spring-pressed slide construction to engage the face of said wheel opposite that bearing said legends to hold the wheel clamped against movement during the printing action, means to guide the element to be printed into position with relation to the type-legend of said wheel which is in printing position, means including a loose-motion spring-pressed slide construction to press said element and said type-legend against one another to effect the printing operation, and means common to said holding-means and said pressing-means to actuate said holding-means to clamp said wheel against movement and thereafter to actuate said pressing-means to effect the printing action.

5. In a printing-mechanism, the combination of a rotary wheel carrying a series of type-legends on a side face thereof adapted by its movements to bring said legends individually into a printing position, means having a bevelled surface to engage the face of said wheel opposite that bearing said legends and a surface to engage the edge of said wheel to hold the wheel clamped against movement during the printing action, said holding-means including a loose-motion spring-pressed slide construction, means to guide the element to be printed into position with relation to the type-legend of said wheel which is in printing position, means including a roller to engage said element and a loose-motion spring-pressed slide acting to roll said roller on the face of said element to press said element and said type-legend against one another to effect the printing operation, and means common to said holding-means and said pressing-means to actuate said holding-means to clamp said wheel against movement and thereafter to actuate said pressing-means to effect the printing action.

JAMES M. TRINER.